United States Patent
Graham-Cumming et al.

(10) Patent No.: US 11,792,294 B2
(45) Date of Patent: *Oct. 17, 2023

(54) METHOD AND APPARATUS FOR REDUCING LOADING TIME OF WEB PAGES

(71) Applicant: Cloudflare, Inc., San Francisco, CA (US)

(72) Inventors: John Graham-Cumming, London (GB); Andrew Galloni, London (GB); Terin Stock, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/481,222

(22) Filed: Sep. 21, 2021

(65) Prior Publication Data

US 2022/0006878 A1    Jan. 6, 2022

Related U.S. Application Data

(63) Continuation of application No. 16/155,299, filed on Oct. 9, 2018, now Pat. No. 11,128,727, which is a
(Continued)

(51) Int. Cl.
*H04L 67/568* (2022.01)
*H04L 67/14* (2022.01)
(Continued)

(52) U.S. Cl.
CPC ............ *H04L 67/568* (2022.05); *H04L 67/14* (2013.01); *H04L 67/61* (2022.05); *H04L 67/01* (2022.05); *H04L 67/02* (2013.01)

(58) Field of Classification Search
CPC ....... H04L 67/568; H04L 67/61; H04L 67/14; H04L 67/01; H04L 67/02
(Continued)

(56) References Cited

U.S. PATENT DOCUMENTS 6,405,223 B1   6/2002   Kelley et al.
6,584,498 B2   6/2003   Nguyen
(Continued)

OTHER PUBLICATIONS

Final Office Action, U.S. Appl. No. 16/155,299, dated Mar. 31, 2021, 18 pages.
(Continued)

*Primary Examiner* — James E Springer
(74) *Attorney, Agent, or Firm* — NICHOLSON DE VOS WEBSTER & ELLIOTT LLP (57) ABSTRACT

A browser receives a web page that includes a script that is configured to control subsequent requests of the browser for at least the web page and caches a first portion of the web page that includes reference(s) to other web resource(s). A subsequent request for the web page is dispatched to the script which returns the cached first portion of the web page to the browser and a request for the full web page is made. Request(s) are also transmitted for the web resource(s) referenced in the first portion of the web page without waiting for the full web page to be received. When the full web page is received, if the first portion of the page matches the corresponding portion of the full page, that corresponding portion is removed from the full page and the remaining page is returned to the browser.

21 Claims, 6 Drawing Sheets

Related U.S. Application Data continuation of application No. 15/811,623, filed on Nov. 13, 2017, now Pat. No. 10,104,194, which is a continuation of application No. 15/192,803, filed on Jun. 24, 2016, now Pat. No. 9,819,762.

(60) Provisional application No. 62/185,470, filed on Jun. 26, 2015.

(51) Int. Cl.
 *H04L 67/61* (2022.01)
 *H04L 67/02* (2022.01)
 *H04L 67/01* (2022.01)

(58) Field of Classification Search
 USPC ........................................................ 709/223
 See application file for complete search history.

(56) References Cited

U.S. PATENT DOCUMENTS

| | | | |
|---|---|---|---|
| 7,523,158 | B1 | 4/2009 | Nickerson et al. |
| 7,895,261 | B2 | 2/2011 | Jones et al. |
| 8,285,808 | B1 | 10/2012 | Joel et al. |
| 8,321,533 | B2 | 11/2012 | Fainberg et al. |
| 8,429,247 | B1 | 4/2013 | Nordman et al. |
| 8,613,089 | B1 | 12/2013 | Holloway et al. |
| 8,751,925 | B1 | 6/2014 | Zhang et al. |
| 8,990,357 | B2 | 3/2015 | Graham-Cumming et al. |
| 9,819,762 | B2 | 11/2017 | Graham-Cumming et al. |
| 9,846,649 | B1 | 12/2017 | Jenkins |
| 2007/0143672 | A1 | 6/2007 | Lipton et al. |
| 2007/0168465 | A1 | 7/2007 | Toppenberg et al. |
| 2009/0276488 | A1 | 11/2009 | Alstad |
| 2009/0287836 | A1 | 11/2009 | Cammarata et al. |
| 2010/0042935 | A1 | 2/2010 | Malden et al. |
| 2010/0205291 | A1 | 8/2010 | Baldry et al. |
| 2011/0055314 | A1 | 3/2011 | Rosenstein et al. |
| 2011/0055683 | A1 | 3/2011 | Jiang |
| 2011/0099294 | A1 | 4/2011 | Kapur et al. |
| 2011/0231482 | A1* | 9/2011 | Benna .................. G06F 16/9535 709/203 |
| 2011/0295979 | A1 | 12/2011 | Alstad et al. |
| 2012/0023090 | A1 | 1/2012 | Holloway et al. |
| 2012/0226972 | A1 | 9/2012 | Fainberg et al. |
| 2013/0055384 | A1 | 2/2013 | Shulman et al. |
| 2013/0073401 | A1 | 3/2013 | Cook |
| 2013/0212462 | A1 | 8/2013 | Athas et al. |
| 2014/0189495 | A1 | 7/2014 | Jiang et al. |
| 2014/0237066 | A1 | 8/2014 | Fainberg et al. |
| 2014/0280677 | A1 | 9/2014 | Altman et al. |
| 2015/0032803 | A1 | 1/2015 | Graham-Cumming et al. |
| 2015/0082424 | A1 | 3/2015 | Shukla |
| 2015/0163087 | A1 | 6/2015 | Conner et al. |
| 2015/0256646 | A1 | 9/2015 | Hofmann et al. |
| 2016/0218942 | A1 | 7/2016 | Choquette et al. |
| 2016/0283499 | A1 | 9/2016 | Cao et al. |

OTHER PUBLICATIONS

Non-Final Office Action from U.S. Appl. No. 15/192,803, dated Dec. 7, 2016, 22 pages.

Non-Final Office Action from U.S. Appl. No. 15/811,623, dated Mar. 13, 2018, 6 pages.

Non-Final Office Action, U.S. Appl. No. 16/155,299, dated Dec. 4, 2020, 15 pages.

Notice of Allowance from U.S. Appl. No. 15/192,803, dated Jun. 8, 2017, 10 pages.

Notice of Allowance from U.S. Appl. No. 15/192,803, dated Sep. 26, 2017, 10 pages.

Notice of Allowance from U.S. Appl. No. 15/811,623, dated Jun. 8, 2018, 7 pages.

Notice of Allowance, U.S. Appl. No. 16/155,299, dated Jul. 23, 2021, 9 pages.

W3C, "Service Workers," W3C Working draft, Feb. 5, 2015, downloaded from https://www.w3.org/TR/2015/WD-service-workers-20150205/, 37 pages.

* cited by examiner

EXAMPLE.COM/INDEX.HTML 310

```
<!doctype html>
<html>
  <head>
    <title>Example Domain</title>
    <link rel="dns-prefetch" href="//example2.com">
    <link rel="stylesheet" type="text/css" media="print" href="printstyles.css">
    <link rel="stylesheet" type="text/css" media="screen" href="styles.css">
    <script type="text/javascript" src="http://example2.com/exampleScript.js" </script>
  </head>
  <body>
    The content ...
    ....

</body>
</html>
```

320 encompasses the full document. 315 encompasses the head section. 325 encompasses the body section.

METHOD AND APPARATUS FOR REDUCING LOADING TIME OF WEB PAGES

CROSS-REFERENCE TO RELATED APPLICATIONS

This application is a continuation of Ser. No. 16/155,299, which is a continuation U.S. application Ser. No. 15/811,623, filed Nov. 13, 2017, Now U.S. Pat. No. 10,104,194, which is a continuation of U.S. application Ser. No. 15/192,803, filed Jun. 24, 2016, now U.S. Pat. No. 9,819,762, which claims the benefit of U.S. Provisional Application No. 62/185,470, filed Jun. 26, 2015, which is hereby incorporated by reference.

FIELD

Embodiments of the invention relate to the field of network communication; and more specifically, to reducing loading time of web pages.

BACKGROUND

An important measure of web page performance is how long it takes for a web page to be downloaded sufficiently for the web browser to start displaying the web page (or parts of it) to the user. Some measurements refer to a Time To First Byte (TTFB), which is defined as a the duration from which a user makes an HTTP request to the first byte of the page being received by the browser. Many studies have shown that this load time directly affects the user experience, revenue generated, and whether a user even bothers to view the page.

A web page typically includes the base HyperText Markup Language (HTML) and potentially a large number of resources that must be loaded so that the web page can be displayed. These resources may include client-side scripts (e.g., JavaScript), Cascading Style Sheets (CSS), and/or images that are required for the correct layout, appearance, and functioning of the web page. These resources are typically loaded by specifying them using HTML in the so-called 'head' of the web page. The head (delimited by <head> and </head> in the HTML) in the web page appears at the start of the HTML of the web page. The web browser fetches these resources as soon as the head arrives (that is, the web browser typically does not wait until the entire page is delivered to fetch these resources). The resources in the head of the web page should be delivered as quickly as possible so that these resources can be fetched in parallel with the arrival of the rest of the page (which also may include client-side scripts, images, etc.). The head may also specify Domain Name System (DNS) names that the browser uses to look up in parallel to ensure that they are ready for page navigation.

It is also the case that at least part of the head is often unchanging from page load to page load for an individual URL. It is common for the head to be generated by a CMS or web server from a common file or program that outputs the list of resources that need to be reloaded. Thus some number of bytes from the start of the web page will be unchanging if the page is reloaded.

Many common web browsers include technology called a "service worker" that can be registered for any domain name and act as a proxy for all requests made for that domain. For example, a service worker could register for example.com (the first time that the browser visits example.com) and remain resident in the browser such that subsequent network requests to example.com are controlled by the service worker thereby placing the service worker conceptually between the rendering engine and the network.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. In the following description and claims, the terms "coupled" along with its derivatives, may be used. "Coupled" is used to indicate that two or more elements, which may or may not be in direct physical or electrical contact with each other, co-operate or interact with each other.

Figure 3:
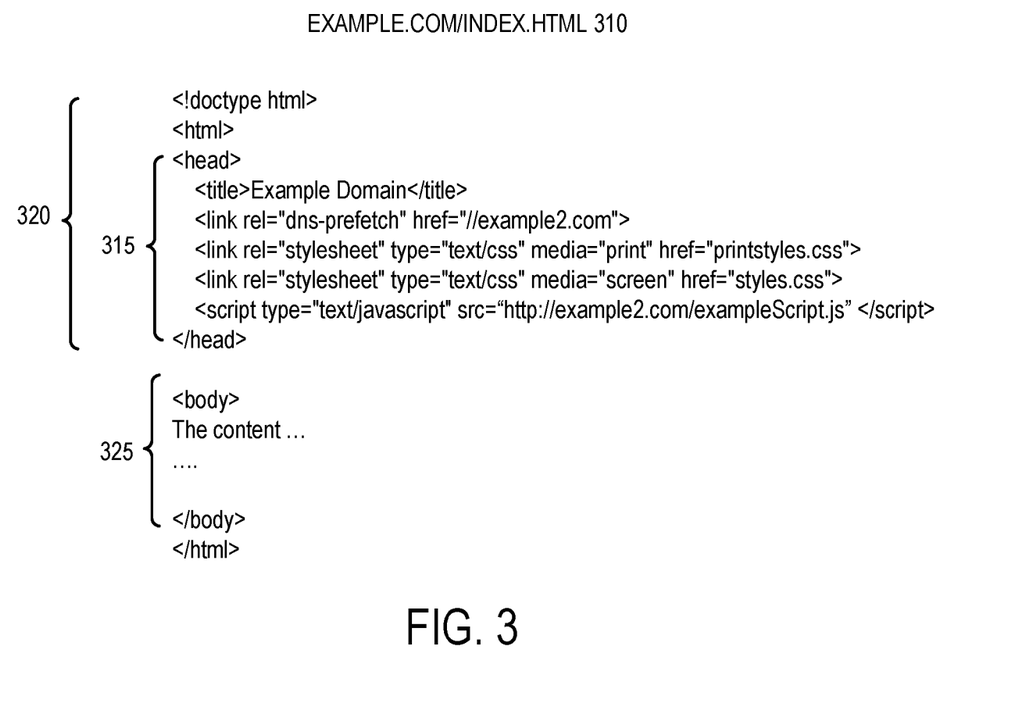
FIG. 3 illustrates the HTML of an exemplary web page.

A method and apparatus for reducing the loading time of a web page is described. A web page typically includes the base HTML and potentially a large number of resources that must be loaded so that the web page can be properly displayed. These resources may include client-side scripts (e.g., JavaScript), Cascading Style Sheets (CSS), and/or images that are required for the correct layout, appearance, and functioning of the web page. These resources are typically loaded by specifying them using HTML in the so-called "head" of the web page. The head (delimited by <head> and </head> in the HTML) in the web page appears at the start of the HTML of the web page. The web browser fetches these resources as soon as the head arrives (that is, the web browser typically does not wait until the entire page is delivered to fetch these resources). The resources in the head of the web page should be delivered as quickly as possible so that these resources can be fetched in parallel with the arrival of the rest of the page (which also may include client-side scripts, images, etc.). The head may also specify Domain Name System (DNS) names that the browser uses to look up in parallel to ensure that they are ready for page navigation. For example, FIG. 3 illustrates the HTML of an exemplary web page 310 (example.com/index.html). The head 315 of the web page 310 specifies the name example2.com for DNS prefetching, includes style sheets, and includes a client-side script. The body 325 of the web page 310 includes most of the content of the web page 310.

The content of at least a portion of the head of a web page is often static (it does not change frequently) from page load to page load for an individual URL and from user to user, even though the body of the web page can often by dynamic. The head may be generated by a Content Management System (CMS) or a web server from a common file or program that outputs the list of resources that need to be reloaded. Thus, there may be a number of bytes from the start of the web page that will be unchanged if the page is reloaded.

In one embodiment, a client-side script (e.g., JavaScript) included or referenced in a web page of a domain is configured to register as a proxy for all requests made for that web page and potentially other web pages of the domain and remain resident in the browser. The client-side script is further configured to cache a beginning portion of the web page. This beginning portion of the web page is optimistically expected to remain static from load to load. In one embodiment, the beginning portion of the web page is the "head" of the web page, delimited by <head> and </head> in the HTML of the web page. On a subsequent request for the web page, the client-side script returns the beginning portion of the web page from cache to begin rendering the web page immediately and transmits a request for the full web page over the network. The web browser renders the beginning portion of the web page including downloading the resources referenced in the beginning portion of the web page, which reduces the loading time of the web page since the browser would otherwise normally have to wait until it begins to receive the full web page from the network in order to download those resources. Upon the client-side script receiving the full web page from the network, the client-side script compares the beginning portion of the received web page with the beginning portion of the web page it returned to the browser from cache. If the beginning portion of the web page has changed, the client-side script may cause the browser to discard the previously returned beginning portion of the web page and instead process the newly received beginning portion of the web page. The client-side script may be a service worker that is configured to reduce loading times of web pages as described herein.

The beginning portion of the page is sometimes referred herein as a "head start chunk." In some embodiments the head start chunk consists of the portion of the web page up to and including the entire head. In other embodiments, the head start chunk may include only a portion of the head. In yet other embodiments, the head start chunk includes the entire head and some portion of the body of the web page. Thus, although this portion of the page is sometimes referred herein as the head start chunk, it may not include the entire head of the web page, it may include content of the web page outside of the head, and it may include content not originally part of the web page (such as an image preloader). By way of example with reference to the web page 310 of FIG. 3, the head start chunk 320 includes all of the html up to and including the closing head tag (</head>).

In one embodiment, the head start chunk may be of a web page that has been designated as being uncacheable. As an example, origin servers may include a "no-cache" directive in the Cache-Control header field of an HTTP response that indicates that a cached version of the resource is not to be used to respond to a request without successful revalidation with the origin server. Previously when the no-cache directive was used, a web browser would check with the origin server to determine whether the resource has been updated and if it has, the browser would request the entire resource from the origin server even if there were a minimal change. However, with the techniques described herein, the service worker may optimistically return the head start chunk of a web page to the web page thread without validation with the origin server even if that web page has been designated with a no-cache directive by the origin server.

Figure 1:
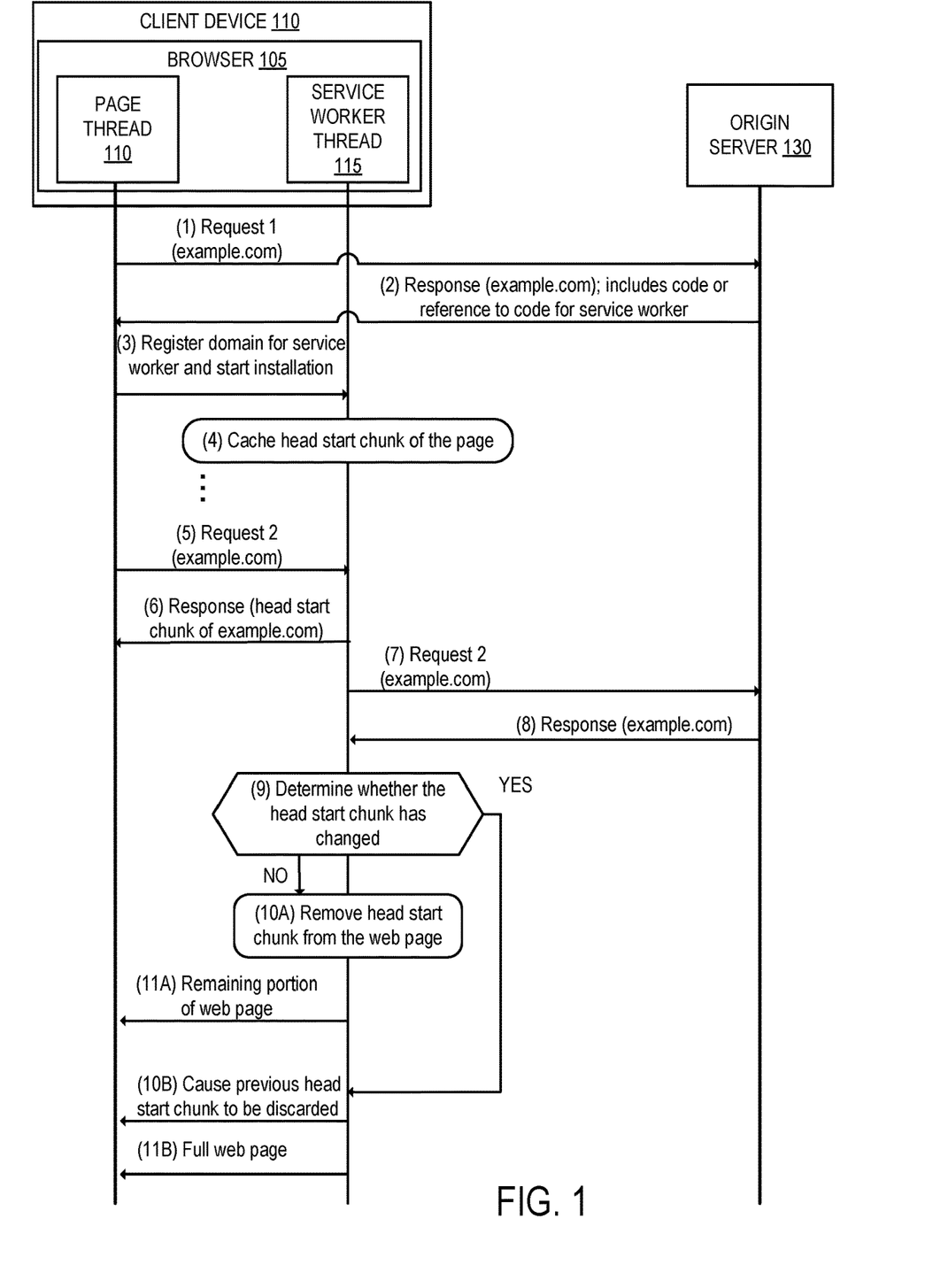
FIG. 1 illustrates an exemplary system for reducing the loading time of a web page according to one embodiment.

FIG. 1 illustrates an example of reducing the loading time of a web page according to one embodiment. FIG. 1 includes the client device 110 and the origin server 130. The client device 110 is a computing device (e.g., desktop, laptop, workstation, smartphone, palm top, mobile phone, tablet, gaming system, set top box, etc.) that is capable of transmitting and receiving web traffic (e.g., HTTP requests/responses, HTTPS requests/responses, SPDY requests/responses, etc.). The client devices 110 executes a client network application that is capable of transmitting and receiving web traffic such as the web browser 105. The web browser 105 includes a web page thread 110 and a service worker thread 115. The origin server 130 maintains or creates web page(s) for one or more domains. In the example of FIG. 1, the origin server 130 maintains the web page corresponding to https://example.com.

At an operation 1, the web browser 105 transmits a request 1 for a web page identified with the URL https://example.com that is received by the origin server 130. The request is typically an HTTP GET request method. The origin server 130 responds to the request by transmitting the response to the web browser 105 at operation 2. The response includes the requested resource (example.com). The requested resource includes code for a service worker or a reference to code for a service worker.

The browser 105 receives the response from the origin server 130 and begins to parse and display the resource (e.g., example.com). As described above, the webpage includes code or a reference to code for a service worker. If there is a reference to the service worker code, the browser 105 downloads the service worker code and begins to execute the service worker code, which is typically a client-side script (e.g., JavaScript). Among other things, the code is configured to, when executed by the browser 105, install the service worker code such that the service worker acts as a proxy for all resources requests made to the domain and optionally a limited scope of the domain. The service worker code typically is executed in a worker context that runs off the web page thread 110, which is referred to as the service worker thread 115. Thus, typically, the service worker is a client-side script that runs independently to the web page thread and may apply to multiple web pages.

At operation 3, the browser 105 (the web page thread 110) registers a service worker (executing in the service thread 115) for the domain (example.com) and scope. The registration process maps the service worker to the URL scope such that future requests that match the URL scope are processed by the service worker. Once successfully registered, the service begins to execute and installs. As part of installation, the service worker is configured to cache the head start chunk of the page. For example, after the service worker has been fetched it can process events the first of which is the oninstall event and in that event the head start chunk of the web page may be cached. At operation 4, as part of the installation of the service worker, the service worker thread 115 caches the head start chunk of the page. This cache is typically not part of the browser's regular HTTP cache. The head start chunk that is cached may not expire unless it is deleted. The head start chunk is typically not removed from cache upon the browser exiting or shutting down.

In response to a subsequent request for the web page (or other page that matches the registered scope of the service worker), the service worker returns the head start chunk to the web page thread from cache such that rendering of the head start chunk of the web browser can begin prior to receipt of a remaining portion of the web page, and transmits a request for the full web page across the network. If the service worker receives the full web page from the network, the service worker determines whether the head start chunk returned to the web page thread matches the head start chunk of the full web page. If the head start chunk returned to the web page thread matches the head start chunk of the full web page, the service worker returns the remaining portion of the web page (the portion of the web page that does not include the head start chunk). If the head start chunk that was returned to the web page thread does not match the head start chunk of the full web page, the service worker causes the web page thread to discard the previous head start chunk and returns the full web page to the web page thread. If the service worker does not receive the full web page (e.g., it does not receive a response from the network, it receives an error response, etc.), the service worker causes the web page thread to replace the web page it is currently rendering with an error page.

The service worker thread 115 listens to events such as network resource requests to the registered domain and scope. Therefore, subsequent requests that match the URL scope will be processed at the service worker thread 115. Sometime after processing the request 1, a subsequent request 2 is made for a resource that matches the URL scope of the service worker at operation 5. As an example, the request 2 may be for the same web page as identified in the request 1. Since the requested resource matches the URL scope of the service worker, the service worker thread 115 will process the request.

As part of processing the request, the service worker accesses the cached head start chunk of the page, generates a response that includes the head start chunk (the response does not include the remaining portion of the web page), and passes the response to the web page thread 110 at operation 6. The response with the head start chunk may also include an HTTP 200 OK status code and any other usual HTTP headers that would normally be associated with an HTTP response. The web page thread 110 receives and renders the head start chunk which allows the web page thread 110 to start the download of any resources referenced in the head start chuck, which reduces the loading time of the web page since the browser would normally have to wait until the full web page is received from the network in order to begin downloading those resources. For example, with reference to FIG. 3, the web page thread 110 can immediately begin to transmit requests for the resources in the head 315 including the style sheets and client-side script and can also transmit a DNS query to resolve the domain example2.com for DNS prefetching. If the head start chunk also includes an image preloader, the web page thread 110 can also begin to transmit requests for the image(s) referenced by the image preloader.

The service worker thread 115 also causes the request 2 to be transmitted to the origin server 130 for the web page. This request comes nearly in parallel with the processing of the received request in operation 5 and generating the response in operation 6. The request is typically an HTTP GET request method and is requesting the full web page from the origin server. If the service worker thread 115 is unable to retrieve the full web page from the origin server 130 after returning the head start chunk to the web page thread 110 (e.g., the origin server 130 returns an HTTP error code (e.g., 4xx status code, 5xx status code) or a redirect code (e.g., 3xx status code) or otherwise is not reachable), the service worker causes the web page thread 110 to replace the web page it is currently parsing with an error page, which may be the error page returned by the origin server 130.

Assuming that the origin server 130 is able to respond to the request 2 of operation 7 with the requested resource, the service worker thread 115 receives the requested resource from the origin server 130 at operation 8 (e.g., the full web page of example.com). The response may also include one or more cookies set by the origin server 130.

There is no guarantee that that the portion of the web page for optimistic transmission (the head start chunk) will remain static upon request to request. For example, the website publisher may change that portion of the web page. Thus, after receiving the full web page from the origin server 130, the service worker thread 115 determines whether the head start chunk returned to the web page thread 110 in operation 6 is the same as the same portion of the web page received from the origin server 130 in operation 8. For example, the service worker thread 115 may compare the start of the full web page received from the origin server 130 at operation 8 with the head start chunk returned to the web page thread 110 at operation 6 to determine whether they are different. This may be done by comparing a hash of the head start chunk returned to the web page thread 110 against a hash of the same part of the web page received from the origin server 130 or through a string comparison.

If the head start chunk has not changed, then the operations 10A and 11A are performed. At operation 10A, the service worker thread 115 removes the head start chunk since it has already returned that chunk to the web page thread 110. Then, at operation 11A, the service worker thread 115 returns the remaining portion of the web page. If the head start chunk has changed, then the operations 10B and 11B are performed. At operation 10B, the service worker thread 115 causes the previous head start chunk returned to the web page thread 110 to be discarded. Then, at operation 11B, the service worker thread 115 returns the full web page to the web page thread 110.

Cookie(s) that are set by the origin server 130 for the requested web page may be unknown at the time the service worker thread 115 returns the head start chunk to the web page thread 110. Cookies are usually set using a Set-Cookie header of the response; however the service worker thread 115 generates a header when returning the head start chunk at operation 6. In one embodiment, the service worker thread 115 uses a Trailer of HTTP Transfer-Encoding defined in RFC 2616 (e.g., section 14.40 of RFC 2616) in order to set the cookie(s) in Set-Cookie header(s) when returning the remaining web page in operation 11A. In another embodiment, the service worker thread 115 sets the cookie(s) programmatically inline.

Figure 2:
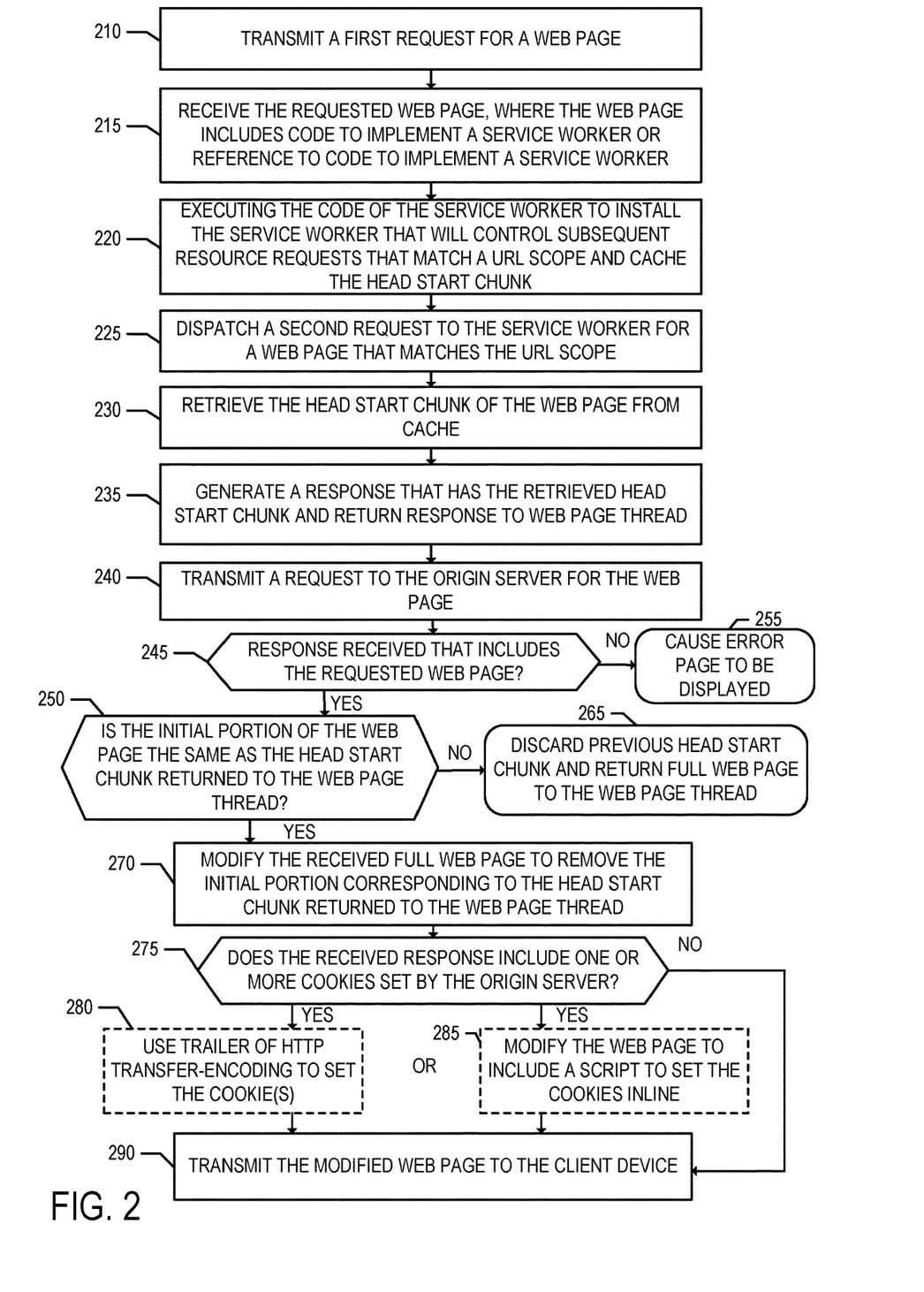
FIG. 2 is a flow diagram that illustrates exemplary operations for reducing the loading time of web pages according to one embodiment.

FIG. 2 is a flow diagram that illustrates exemplary operations for reducing the loading time of web pages according to one embodiment. At operation 210, a web browser 105 transmits a request for a web page (e.g., an HTTP GET request) to the network. The request may be received by the origin server for the web page or other server (e.g., a proxy server that services requests for the origin server). Flow then moves to operation 215 where the web browser 105 receives the requested web page from the network. The requested web page includes code for a service worker or a reference to a service worker. As will be described in greater detail later herein, the code or reference to code for the service worker may be added by the proxy server and not part of the original web page as it exists on its origin server.

At operation 220, the web browser 105 parses and begins to execute the requested web page including executing the code of the service worker (which may require the web browser 105 to download the code for the service worker) to install the service worker. The service worker is implemented through a client-side script and is configured to, when executed by the web browser 105, to register a URL scope (a tuple of the domain of the web page and a path expression) to control processing of subsequent requests of the web browser 105 that match that URL scope. The service worker caches a beginning portion of the web page (the head start chunk). The web browser 105 further processes the web page as it normally would.

Sometime later, at operation 225, a second request for a web page that matches the URL scope of the service worker is dispatched to the service worker. The service worker may be listening for network resource requests that match the URL scope for which it is registered. For example, a user has browsed to a web page that matches the URL scope of the service worker. As described above, the service worker is configured to process the request including retrieving the head start chunk from cache. Thus, at operation 230, the head start chunk of the requested web page is retrieved from cache. Flow then moves to operation 235 where the service worker generates a response that includes the retrieved head start chunk and returns the generated response to the web page thread. This generated response does not include the entire requested web page. The generated response may also include an HTTP 200 OK status code and any other usual HTTP headers that would normally be associated with an HTTP response. In a specific embodiment, the head start chunk is the "head" of the web page, delimited by <head> and </head> in the HTML of the web page. The web browser 105 begins to process the head start chunk immediately including transmitting requests for any resources referenced in the head start chunk.

Flow then moves to operation 240 and the service worker transmits a request for the full web page to the network. The request may be received by the origin server for the web page or other server such as a proxy server that services requests for the origin server. The request may be transmitted before, after, or in parallel with generating the response that includes the head start chunk of operation 235, but generally at about the same time. At operation 245, a determination is made whether a response is received from the network that includes the requested web page. As previously described, it is possible that an HTTP error code (e.g., 4xx status code, 5xx status code) or a redirect (e.g., 3xx status code) may be returned. It is also possible that no response is received (e.g., the origin server is offline). Of course, it is also possible a response that includes the requested web page is received. If a response is received that includes the requested web page, then flow moves to operation 250, otherwise flow moves to operation 255.

As previously described, the service worker returns a portion of the requested web page that is anticipated to be static (will not change) from request to request (the head start chunk). However, there is no guarantee that this portion will remain static. Therefore, at operation 250, after receiving the full web page from the network, the service worker determines whether the head start chunk returned to the web page thread in operation 235 is the same as the same portion of the full web page received in the response of operation 245. This may be done by comparing a hash of the head start chunk returned to the web page thread against a hash of the same part of the web page received or through a string comparison. If the head start chunk returned to the web page thread is different from the same portion of the full web page, then flow moves to operation 265 where the previous head start chunk returned to the web page thread is discarded and the full web page is returned to the web page thread. A new head start chunk may be cached by the service worker to return for subsequent requests. If the head start chunk returned to the web page thread is the same as the same portion of the full web page, then flow moves to operation 260 where the service worker modifies the full web page by removing the initial portion of the web page corresponding to the head start chunk previously returned to the web page thread. Flow moves from operation 260 to operation 270.

Cookie(s) that are set by the origin server for the requested web page will typically be unknown at the time the service worker returns the head start chunk to the web page thread. At operation 270, a determination is made whether the received response that has the full web page includes one or more cookies. If the response does not include cookie(s), then flow moves to operation 290. Cookies are usually set using a Set-Cookie header of the response; however the headers may already be generated and returned to the web page thread at operation 235. In one embodiment, if the response includes cookie(s), flow moves to operation 280 where the service worker uses a Trailer of HTTP Transfer-Encoding in order to set the cookie(s) in Set-Cookie header(s) when returning the remaining web page. In another embodiment, if the response includes cookie(s), flow moves to operation 285 where the service worker sets the cookie(s) programmatically inline (e.g., by modifying the web page to include a script that sets the cookies programmatically inline) Flow moves from both operations 280 and 285 to operation 290, where the service worker returns the modified web page to the web page thread.

Embodiments described herein reduce the loading time of a web page in at least two ways. First, the head start chunk becomes available as fast as loading the chunk from cache, which is generally much faster than a round-trip request to the network (a round-trip request to the web server requires time for a connection to be established, the time taken to send the HTTP request, and the time to get the first byte of the page). This causes the Time To First Byte to be essentially zero. Secondly, since the head start chunk is available more quickly, the web browser may begin to download the resources referenced in the head start chunk more quickly.

Figure 4:
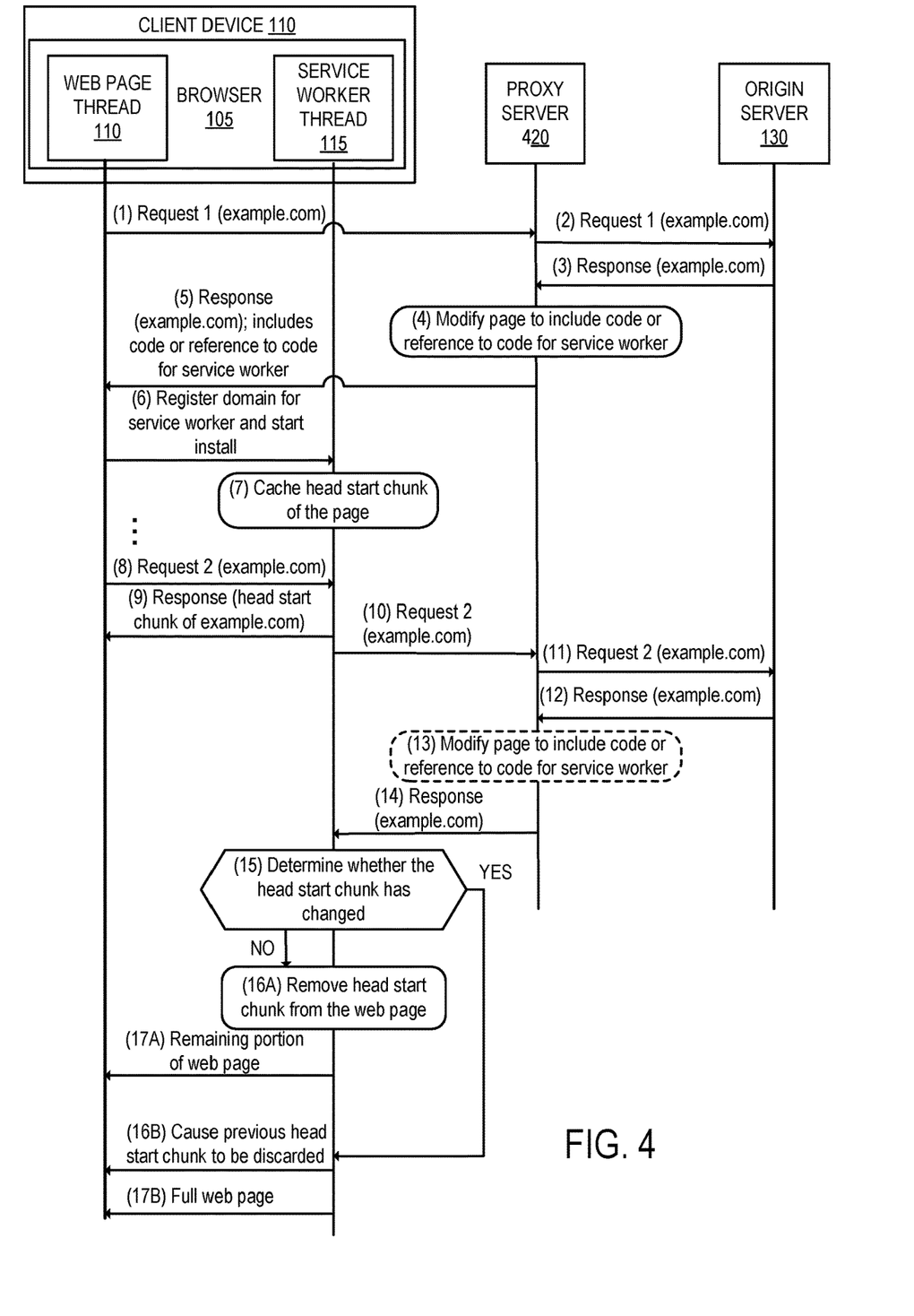
FIG. 4 illustrates an exemplary system for reducing the loading time of a web page according to another embodiment.

In some embodiments, the code for the service worker is automatically added by a proxy server that handles requests and responses on behalf of the origin server. FIG. 4 illustrates an example of reducing the loading time of a web page according to another embodiment. FIG. 4 includes the client device 110, the proxy server 420, and the origin server 130.

The proxy server 420 is situated between the client device 110 and the origin server 130 and receives and processes certain traffic between the client device 110 and the origin server 130. In one embodiment, the proxy server 420 is a reverse proxy server. Web traffic (e.g., HTTP requests/responses, HTTPS requests/responses, SPDY requests/responses, etc.) for domain(s) serviced by the origin server 130 may be received and processed at the proxy server 420. Although FIG. 4 illustrates the proxy server 420 communicating with a single origin server 130, in some embodiments the proxy server 420 communicates and provides services for additional origin servers and different domains that may be owned by different entities. In one embodiment, the proxy server 420 and the services it provides is part of a cloud-based proxy service that provides services for domain owners. By way of example, the cloud-based proxy service may provide a service to reduce the loading time of web pages. The cloud-based proxy service may also provide security services (e.g., detecting and/or mitigating denial of service attacks, proactively stopping botnets, cleaning viruses, trojans, and/or worms, etc.) and/or other performance services and performance services (e.g., acting as a node in a content delivery network (CDN) and dynamically caching customer's files closer to visitors, TCP stack optimizations, etc.).

At an operation 1, the proxy server 420 receives a request for a web page identified with the URL https://example.com. The request is typically an HTTP GET request method. The origin server 130 is the origin server that maintains the web page corresponding to https://example.com. In one embodiment, the proxy server 420 receives the request instead of the origin server 130 because the domain example.com resolves to an IP address of the proxy server 420 instead of an IP address of the origin server 130. Thus, when making a DNS request for example.com, the returned IP address for example.com is an IP address of the proxy server 420. In some embodiments, multiple domains that may be owned by different domain owners may resolve to the proxy server 420 (e.g., resolve to the same IP address or a different IP address of the proxy server 420).

In one embodiment, the proxy server 420 is one of multiple proxy servers that are geographically distributed and are anycasted to the same IP address or the same set of IP addresses. The proxy server 420 may receive the request because it is the closest proxy server to the client device 110 in terms of routing protocol metrics (e.g., Border Gateway Protocol (BGP) metrics) according to an Anycast implementation as determined by the network infrastructure (e.g., the routers, switches, or other network equipment between the client device 110 and the proxy server 420) that is not illustrated in FIG. 1 for simplicity purposes.

After receiving the request, the proxy server 420 transmits a request to the origin server 130 for the document identified with the URL https://example.com. The request 150 is typically an HTTP GET request method. Assuming that the origin server 130 has access to the requested resource, the origin server 130 responds to the request by transmitting a response that includes the requested resource to the proxy server 420 at operation 3. The requested resource (example.com) does not include code, or reference to code, for a service worker to reduce the loading time of a web page as described herein. At operation 4, the proxy server 420 automatically modifies the requested resource (example.com) to include code, or reference to code, for a service worker. For example, the proxy server 420 modifies the HTML of the page to include a client-side script for the service worker or a reference to the client-side script for the service worker. The proxy server 420 then transmits a response to the web browser 105 that includes the modified requested resource at operation 5. The proxy server 420 may also cache the resource received from the origin server 130 and/or cache the resource as modified with the code, or reference to code, for the service worker.

The browser 105 receives the response from the origin server 130 and renders the returned page (e.g., example.com). As described above, the webpage includes code or a reference to code for a service worker. If there is a reference to the service worker code, the browser 105 downloads the service worker code and begins to execute the service worker code, which is typically a client-side script (e.g., JavaScript). Among other things, the code is configured to, when executed by the browser 105, install the service worker code such that the service worker acts as a proxy for all resources requests made to the domain and optionally a limited scope of the domain. The service worker code typically is executed in a worker context that runs off the web page thread 110. Thus, at operation 6, the browser 105 (the web page thread 110) registers a service worker (executing in the service thread 115) for the domain (example.com) and scope and the service worker thread 115 finishes the rest of the installation of the service worker. After installing the service worker, any subsequent requests that match the URL scope will be processed at the service worker.

The service worker is configured to cache the head start chunk of the page. Thus at operation 7, the service worker thread 115 caches the head start chunk of the page. This cache is typically not part of the browser's regular HTTP cache. The head start chunk that is cached may not expire unless it is deleted. The head start chunk is typically not removed from cache upon the browser exiting or shutting down.

The service worker thread 115 listens to events such as resource requests to the registered domain and scope. Thus subsequent requests that match the URL scope will be processed at the service worker thread 115. Sometime after processing the request 1, a request 2 is made for a resource that matches the URL scope of the service worker at operation 8. As an example, the request 2 may be for the same web page as identified in the request 1. Since the requested resource matches the URL scope of the service worker, the service worker thread 115 will process the request.

As part of processing the request, the service worker accesses the cached head start chunk of the page, generates a response that includes the head start chunk (the response may not include the remaining portion of the web page), and passes the response to the web page thread 110 at operation 9. The response with the head start chunk may also include an HTTP 200 OK status code and any other usual HTTP headers that would normally be associated with an HTTP response. The web page thread 110 receives and begins processing the head start chunk which allows the web page thread 110 to begin to download any resources referenced in the head start chuck, which reduces the loading time of the web page since the browser would normally have to wait until the origin server begins to return the full web page in order to download those resources. For example, with reference to FIG. 3, the web page thread 110 can immediately begin to transmit requests for the resources in the head 315 including the style sheets and client-side script and can also transmit a DNS query to resolve the domain example2.com for DNS prefetching. If the head start chunk also includes an image preloader, the web page thread 110 can also begin to transmit requests for the image(s) referenced by the image preloader.

The service worker thread 115 also causes the request 2 for the web page to be transmitted at operation 10. This request comes nearly in parallel with the processing of the received request in operation 8 and generating the response in operation 9. The request is typically an HTTP GET request method and is requesting the full web page. The proxy server 420 receives the request and transmits a request to the origin server 130 for the requested resource at operation 11. Assuming that the origin server 130 is able to respond to the request 2 of operation 11 with the requested resource, the proxy server 420 receives the requested resource from the origin server 130 at operation 12 (e.g., the full web page of example.com). The response may also include one or more cookies set by the origin server 130. After receiving the response from the origin server 130, the proxy server 420 may modify the page to include code, or reference to the code, for the service worker in a similar way as described with respect to operation 4. The proxy server 420 transmits the response (which may include the modified resource) to the service worker thread 115 at operation 14.

After receiving the full web page, the service worker thread 115 determines whether the head start chunk returned to the web page thread 110 in operation 9 is the same as the same portion of the web page received in operation 14. For example, the service worker thread 115 may compare the start of the full web page received at operation 14 with the head start chunk returned to the web page thread 110 at operation 9 to determine whether they are different. This may be done by comparing a hash of the head start chunk returned to the web page thread 110 against a hash of the same part of the full web page or through a string comparison.

If the head start chunk has not changed, then the operations 16A and 17A are performed. At operation 16A, the service worker thread 115 removes the head start chunk since it has already returned that chunk to the web page thread 110). Then, at operation 17A, the service worker thread 115 returns the remaining portion of the web page. If the head start chunk has changed, then the operations 16B and 17B are performed. At operation 16B, the service worker thread 115 causes the previous head start chunk it returned to the web page thread 110 to be discarded. Then, at operation 17B, the service worker thread 115 returns the full web page to the web page thread 110.

Cookie(s) that are set by the origin server 130 for the requested web page may be unknown at the time the service worker thread 115 returns the head start chunk to the web page thread 110. Cookies are usually set using a Set-Cookie header of the response; however the service worker thread 115 generates a header when returning the head start chunk at operation 9. In one embodiment, the service worker thread 115 uses a Trailer of HTTP Transfer-Encoding defined in RFC 2616 (e.g., section 14.40 of RFC 2616) in order to set the cookie(s) in Set-Cookie header(s) when returning the remaining web page in operation 17A. In another embodiment, the service worker thread 115 sets the cookie(s) programmatically inline.

Although a portion of the head of a web page is often static, some web pages include dynamic data or data that changes frequently in the head. For example, some news web pages may include metadata in the head that indicates the time that the page was modified, which would change often as different news stories appear on the page. As another example, the web page may allow for personalization such as a custom background that may affect the content of the head from user to user. These dynamic elements of the head may be interspersed in any order with the static elements of the head. In one embodiment, the proxy server 420 reorders the content of the head such that the elements that are static are moved to a location prior to elements of the head that are dynamic. Reordering the elements such that the static elements are prior to the dynamic elements may increase the length of the portion of the web page that is optimistically transmitted to the requesting client device. By way of example, the <title> element, the <meta> tag for Content-Type (e.g., <meta http-equiv="Content-Type" . . . />, the style sheet element(s) that use the <link> tag (e.g., <link rel="stylesheet" type="text/css" media="print" href="printstyles.css">), the client-side script element(s) that use the <script> tag, and the DNS prefetching element (e.g., <link rel="dns-prefetch" href="//example2.com">) are static elements. In one embodiment, the reordering of elements is performed dynamically at the proxy server without requiring the website publisher to change the code of the web page. For example, with respect to FIG. 4, the proxy server 420 scans the HTML of the resource included in the response at operation 3 to locate static elements of the HTML and reorders them (if necessary) such that they will be in the HTML prior to dynamic elements, prior to transmitting the response to the browser 105 at operation 5. The proxy server 420 performs the same reordering with respect to the resource included in the response 12 and prior to transmitting the response to the browser 105 at operation 14. In one embodiment, the order in which these static elements originally appear are preserved in the reordering. In another embodiment, the static elements are grouped according to type (e.g., style sheet elements, client-side script elements, DNS prefetching element, etc.) and within that grouping the relative ordering of the static element(s) is preserved.

Figure 5:
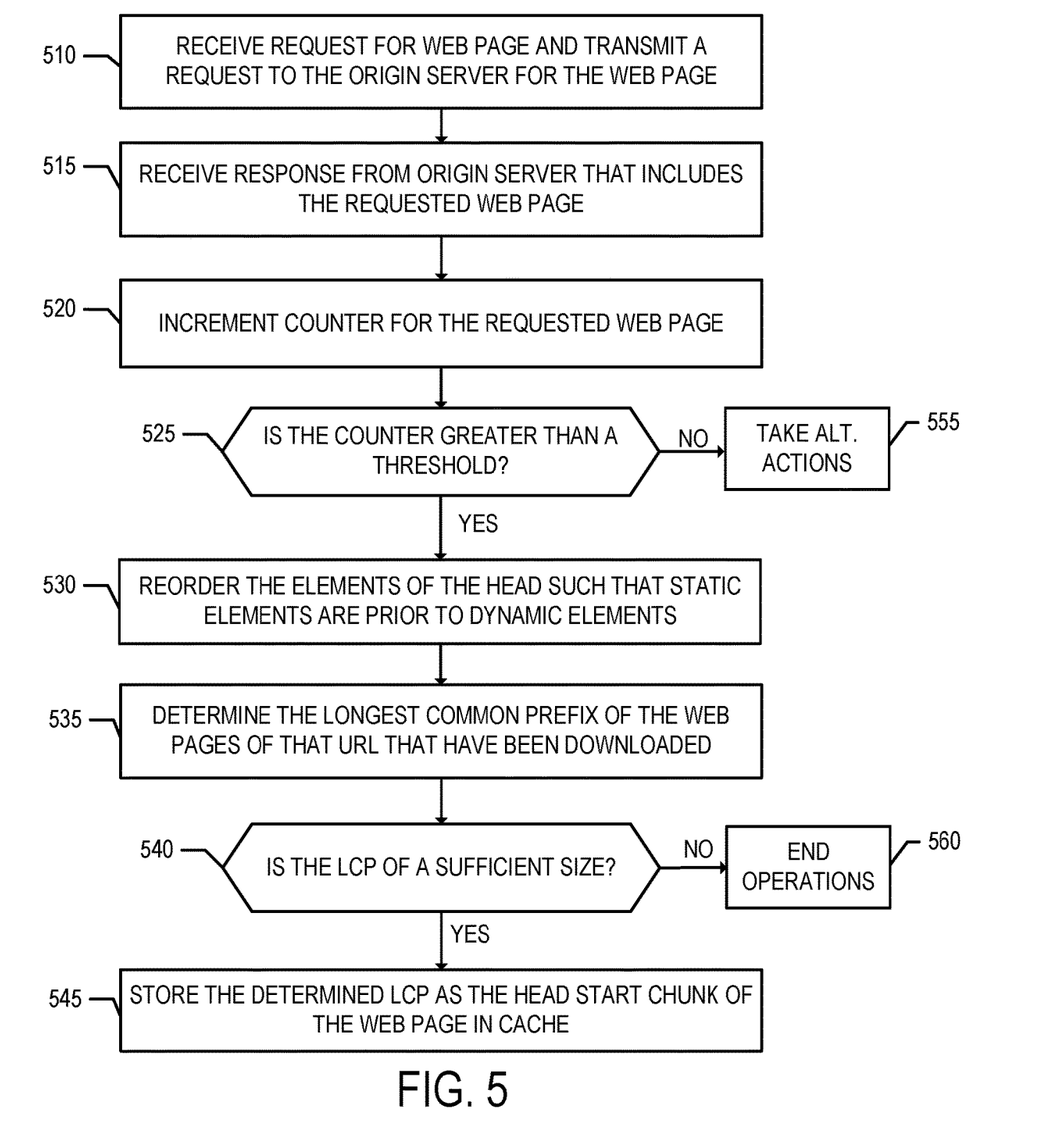
FIG. 5 is a flow diagram that illustrates exemplary operations for dynamically determining the portion of the web page to be the head start chunk according to one embodiment.

FIG. 5 is a flow diagram that illustrates exemplary operations for dynamically determining the portion of the web page to be the head start chunk according to one embodiment. In one embodiment the proxy server 420 determines the head start chunk after observing a certain number of requests for the URL of the web page and corresponding downloads of the web page corresponding to that URL from the origin server 130. This increases the accuracy of the prediction that the head start chunk of the web page remains static (unchanging) when the page is reloaded. At operation 510, the proxy server 420 receives a request for a web page and transmits a request to the origin server 130 for the requested web page (e.g., an HTTP GET request for the web page). Flow then moves to operation 515 where the proxy server 420 receives a response from the origin server 130 that includes the requested web page. Flow then moves from operation 515 to operation 520 where the proxy server 420 increments a counter for the requested web page. Flow then moves from operation 520 to operation 525 where the proxy server determines whether the counter is greater than a threshold (e.g., 1000 requests to that URL). If the counter is not greater than the threshold, then flow moves to operation 555 where alternative actions are taken (e.g., at least a portion of the requested web page may be stored for future determination of the static portion of the web page, which may be stored after the operation described in operation 530). If the counter is greater than the threshold, then flow moves to operation 502.

At operation 530, which is optional in some embodiments, the proxy server 420 reorders the elements of the head of the page received from the origin server 130 such that the static elements are prior to the dynamic elements of the page. For example, the proxy server 420 scans the html of the page to locate static elements of the HTML and reorders them (if necessary) such that they will be in the html prior to dynamic elements.

Flow moves from operation 530 to operation 535 where the proxy server 420 determines the longest common prefix (LCP) of the web pages of that URL that the proxy server has downloaded from the origin server (after any reordering performed in operation 530). The LCP may be determined using a number of algorithms including those that use tries. For example, the algorithm may build a trie or suffix array to determine the LCP. Alternatively, an algorithm that performs a linear search through the pages of the URL that have been downloaded (after any reordering performed in operation 530) may be performed to determine the LCP. As another option, a binary search through the pages of the URL that have been downloaded (after any reordering performed in operation 530) may be performed to determine the LCP. Flow moves from operation 535 to operation 540.

At operation 540, the proxy server 420 determines whether the determined LCP is of a sufficient size to be useful as a head start chunk. For example, if the LCP is too small to contain any references to resources it is not suitable as a head start chunk and likely means that the initial portion of the web page is not static. In one embodiment, a threshold is used to determine if the LCP is of a sufficient size. In another embodiment, proxy server 420 determines whether the LCP includes everything up to and including the closing head tag (</head>). If the LCP is not of a sufficient size, then flow moves to operation 560 where the operations end. If the LCP is of a sufficient size, then flow moves to operation 545 where the proxy server 420 stores the determination of what should be included in the head start chunk. The proxy server 420 may also generate the code for the service worker to include in future responses in the modified web page that causes a service worker to be installed and the determined head start chunk to be cached by the web browser. In embodiments where the proxy server 420 is one of multiple proxy servers that are anycasted to the same address and may receive requests for the web page from client devices depending on the location of those client devices, the proxy server 420 may cause the determination of what should be included in the head start chunk and possibly the code of the service worker to be installed to be transmitted to those proxy.

In one embodiment, the head start chunk may also include an added image preloader (e.g., a JavaScript image preloader) that is configured to, when executed by the web browser, load one or more images referenced in the body of the web page. For example, a prediction may be made for the image(s) referenced in the body of the web page that are most likely to be loaded and an image preloader may be added (included in the portion of the page that is the head start chunk) that is configured to preload those image(s) by making the request(s) for those images before the HTML that includes the references to those images are actually delivered to the client device. The prediction of the image(s) referenced in the body that are most likely to be loaded may be based on an analysis of the page as it is being passed through the proxy server. In another embodiment, the referenced image(s) to be included in the image preloader are defined by the website publisher or other administrator.

While embodiments have described that the service worker caches the head start chunk of the page, in some embodiments at least some of the resource(s) referenced in the head start chunk of the page are also cached by the service worker. In such embodiments, instead of the browser transmitting a network request for such a resource, the service worker returns the resource from the cache to the browser.

Figure 6:
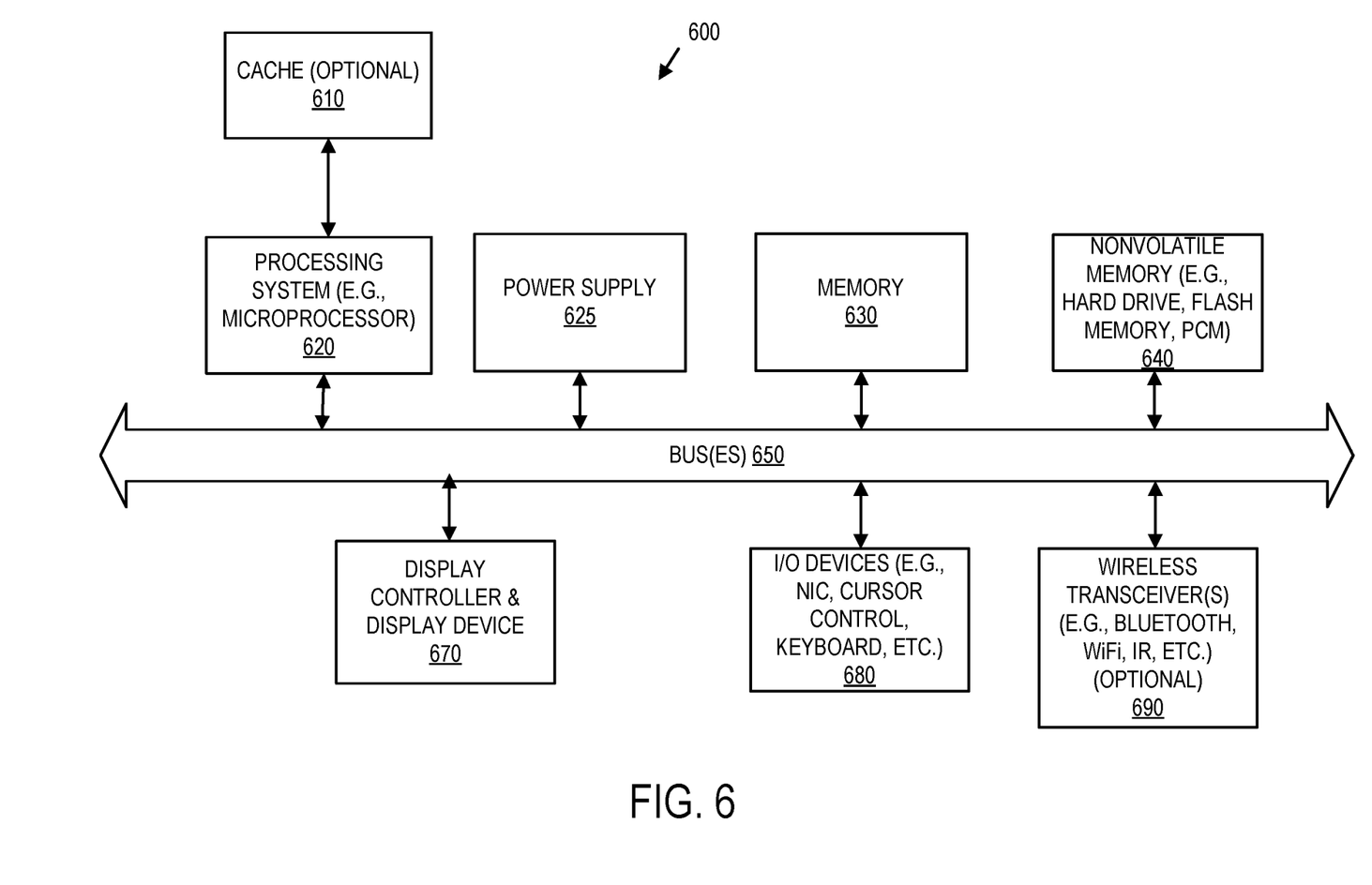
FIG. 6 illustrates a computer system that may be used in some embodiments.

As illustrated in FIG. 6, the computer system 600, which is a form of a data processing system, includes the bus(es) 650 which is coupled with the processing system 620, power supply 625, memory 630, and the nonvolatile memory 640 (e.g., a hard drive, flash memory, Phase-Change Memory (PCM), etc.). The bus(es) 650 may be connected to each other through various bridges, controllers, and/or adapters as is well known in the art. The processing system 620 may retrieve instruction(s) from the memory 630 and/or the nonvolatile memory 640, and execute the instructions to perform operations described herein. The bus 650 interconnects the above components together and also interconnects those components to the display controller & display device 670, Input/Output devices 680 (e.g., NIC (Network Interface Card), a cursor control (e.g., mouse, touchscreen, touchpad, etc.), a keyboard, etc.), and the optional wireless transceiver(s) 690 (e.g., Bluetooth, WiFi, Infrared, etc.). In one embodiment, the client device 110, the proxy server 420, and/or the origin server 130 can take the form of the computer system 600.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While embodiments described herein refer to adding an image preloader to the head start chunk, in other embodiments other preloader(s) in addition to, or in lieu of, the image preloader may be added to the head start chunk (e.g., other network resource preloader(s)).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for reducing loading time of a web page, comprising;
receiving a first request for the web page;
retrieving a first version of the web page;
storing a first portion of the first version of the web page in cache, wherein the first portion of the first version of the web page is not the entire first version of the web page;
receiving a second request for the web page, wherein the second request is subsequent to the first request;
returning, from the cache, the first portion of the first version of the web page, wherein the first portion of the first version of the web page includes a set of one or more references to a set of one or more web resources to cause one or more requests for the set of one or more web resources to be made prior to an entirety of the first version of the page being returned;
retrieving the second version of the web page wherein the retrieving the second version of the web page is subsequent to returning the first portion of the first version of the web page;
determining that a first portion of the second version of the web page is the same as the first portion of the first version of the web page; and
returning a second portion of the second version of the web page wherein the second portion of the second version does not include the first portion of the second version.

2. The method of claim 1, wherein the first portion of the first version of the web page does not include information beyond a closing head tag of the web page.

3. The method of claim 1, wherein the cache is available to a script that is configured to control subsequent requests for the web page.

4. The method of claim 3, wherein the script is further configured to control subsequent requests for other web pages of a same domain as the web page.

5. The method of claim 1, further comprising:
receiving a third request for the web page wherein the third request is subsequent to the first request;
returning, from the cache, the first portion of the first version of the web page;
retrieving a third version of the web page wherein the retrieving the third version of the web page is subsequent to returning the first portion of the first version of the web page;
determining that a first portion of the third version of the web page is not the same as the first portion of the first version of the web page;
causing the first portion of the first version of the web page to be discarded; and
returning the third version of the web page.

6. The method of claim 1, further comprising:
determining a longest common prefix (LCP) of a plurality of versions of the web page;
wherein the LCP is a portion that is common to all of the plurality of versions of the web page;
wherein the first and second version of the web page are each one of the plurality of versions of the web page; and
wherein the first portion of the first version of the web page is the LCP.

7. The method of claim 1, wherein the first portion of the first version of the web page also includes an image preloader that is configured to transmit one or more requests for one or more images respectively that were originally referenced in a different portion from the first portion of the first version of the web page.

8. A non-transitory computer-readable storage medium that provides instructions that, when executed by a processor, cause said processor to perform operations comprising:
receiving a first request for a web page;
retrieving a first version of the web page;
storing a first portion of the first version of the web page in cache, wherein the first portion of the first version of the web page is not the entire first version of the web page;
receiving a second request for the web page wherein the second request is subsequent to the first request;
returning, from the cache, the first portion of the first version of the web page, wherein the first portion of the first version of the web page includes a set of one or more references to a set of one or more web resources to cause one or more requests for the set of one or more web resources to be made prior to an entirety of the first version of the page being returned;
retrieving the second version of the web page wherein the retrieving the second version of the web page is subsequent to returning the first portion of the first version of the web page;
determining that a first portion of the second version of the web page is the same as the first portion of the first version of the web page; and
returning a second portion of the second version of the web page wherein the second portion of the second version does not include the first portion of the second version.

9. The non-transitory computer-readable storage medium of claim 8, wherein the first portion of the first version of the web page does not include information beyond a closing head tag of the web page.

10. The non-transitory computer-readable storage medium of claim 8, wherein the cache is available to a script that is configured to control subsequent requests for the web page.

11. The non-transitory computer-readable storage medium of claim 10, wherein the script is further configured to control subsequent requests for other web pages of a same domain as the web page.

12. The non-transitory computer-readable storage medium of claim 8 that provides further instructions that, when executed by the processor, cause said processor to perform further operations comprising:
receiving a third request for the web page wherein the third request is subsequent to the first request;
returning, from the cache, the first portion of the first version of the web page;
retrieving a third version of the web page wherein the retrieving the third version of the web page is subsequent to returning the first portion of the first version of the web page;
determining that a first portion of the third version of the web page is not the same as the first portion of the first version of the web page;
causing the first portion of the first version of the web page to be discarded; and
returning the third version of the web page.

13. The non-transitory computer-readable storage medium of claim 8 that provides further instructions that, when executed by the processor, cause said processor to perform further operations comprising:

determining a longest common prefix (LCP) of a plurality of versions of the web page;
wherein the LCP is a portion that is common to all of the plurality of versions of the web page;
wherein the first and second version of the web page are each one of the plurality of versions of the web page; and
wherein the first portion of the first version of the web page is the LCP.

14. The non-transitory computer-readable storage medium of claim 8, wherein the first portion of the first version of the web page also includes an image preloader that is configured to transmit one or more requests for one or more images respectively that were originally referenced in a different portion from the first portion of the first version of the web page.

15. An apparatus for reducing loading time for a web page comprising:
a processor; and
a non-transitory computer-readable storage medium coupled with the processor that stores instructions that, when executed by the processor, cause said processor to perform the following:
receive a first request for the web page;
retrieve a first version of the web page;
store a first portion of the first version of the web page in cache, wherein the first portion of the first version of the web page is not the entire first version of the web page;
receive a second request for the web page wherein the second request is subsequent to the first request;
return, from the cache, the first portion of the first version of the web page, wherein the first portion of the first version of the web page includes a set of one or more references to a set of one or more web resources to cause one or more requests for the set of one or more web resources to be made prior to an entirety of the first version of the page being returned;
retrieve the second version of the web page wherein the retrieving the second version of the web page is subsequent to returning the first portion of the first version of the web page;
determine that a first portion of the second version of the web page is the same as the first portion of the first version of the web page; and
return a second portion of the second version of the web page wherein the second portion of the second version does not include the first portion of the second version.

16. The apparatus of claim 15, wherein the first portion of the first version of the web page does not include information beyond a closing head tag of the web page.

17. The apparatus of claim 15, wherein the cache is available to a script that is configured to control subsequent requests for the web page.

18. The apparatus of claim 15, wherein the non-transitory computer-readable storage medium stores further instructions that, when executed by the processor, cause said processor to perform the following:
receive a third request for the web page wherein the third request is subsequent to the first request;
return, from the cache, the first portion of the first version of the web page;
retrieve a third version of the web page wherein the retrieving the third version of the web page is subsequent to returning the first portion of the first version of the web page;
determine that a first portion of the third version of the web page is not the same as the first portion of the first version of the web page;
cause the first portion of the first version of the web page to be discarded; and
return the third version of the web page.

19. The apparatus of claim 15, wherein the non-transitory computer-readable storage medium stores further instructions that, when executed by the processor, cause said processor to perform further the following:
determining a longest common prefix (LCP) of a plurality of versions of the web page;
wherein the LCP is a portion that is common to all of the plurality of versions of the web page;
wherein the first and second version of the web page are each one of the plurality of versions of the web page; and
wherein the first portion of the first version of the web page is the LCP.

20. The apparatus of claim 15, wherein the first portion of the first version of the web page also includes an image preloader that is configured to transmit one or more requests for one or more images respectively that were originally referenced in a different portion from the first portion of the first version of the web page.

21. The apparatus of claim 17, wherein the script is further configured to control subsequent requests for other web pages of a same domain as the web page.

* * * * *